United States Patent [19]
Haddad, Jr.

[11] 3,921,955
[45] Nov. 25, 1975

[54] POSITIONING ASSEMBLY FOR VALVE CLOSURE MEMBERS

[75] Inventor: Joseph J. Haddad, Jr., Cincinnati, Ohio

[73] Assignee: The Lunkenheimer Company, Cincinnati, Ohio

[22] Filed: Jan. 28, 1974

[21] Appl. No.: 437,191

[52] U.S. Cl. .................. 251/297; 74/531; 251/305
[51] Int. Cl.² ........................................ F16K 35/04
[58] Field of Search ............... 251/297, 305; 74/531

[56] References Cited
UNITED STATES PATENTS

| | | | |
|---|---|---|---|
| 756,491 | 4/1904 | Gold | 251/297 X |
| 2,432,225 | 12/1947 | Carbon | 251/297 X |
| 3,115,896 | 12/1963 | Roberts | 251/297 X |
| 3,466,008 | 9/1969 | Kitazawa | 251/297 |

Primary Examiner—Alan Cohan
Attorney, Agent, or Firm—Wood, Herron & Evans

[57] ABSTRACT

A valve positioning assembly for use in combination with a valve of the type having a rotatable stem for pivotally positioning a valve closure member, e.g., a butterfly valve. The positioning assembly includes a pair of superimposed discs through which the stem passes. At least one disc is flexible. One of the two discs is stationary, while the other one is rotatable with the stem. The discs are provided with interengageable circumferentially spaced detents operative to position and lock the valve closure member in an "open" position, a "closed" position and a number of intermediate throttle positions wherein the closure member is held at various angles with respect to the direction of fluid flow. A handle is provided for rotatably positioning the stem.

11 Claims, 5 Drawing Figures

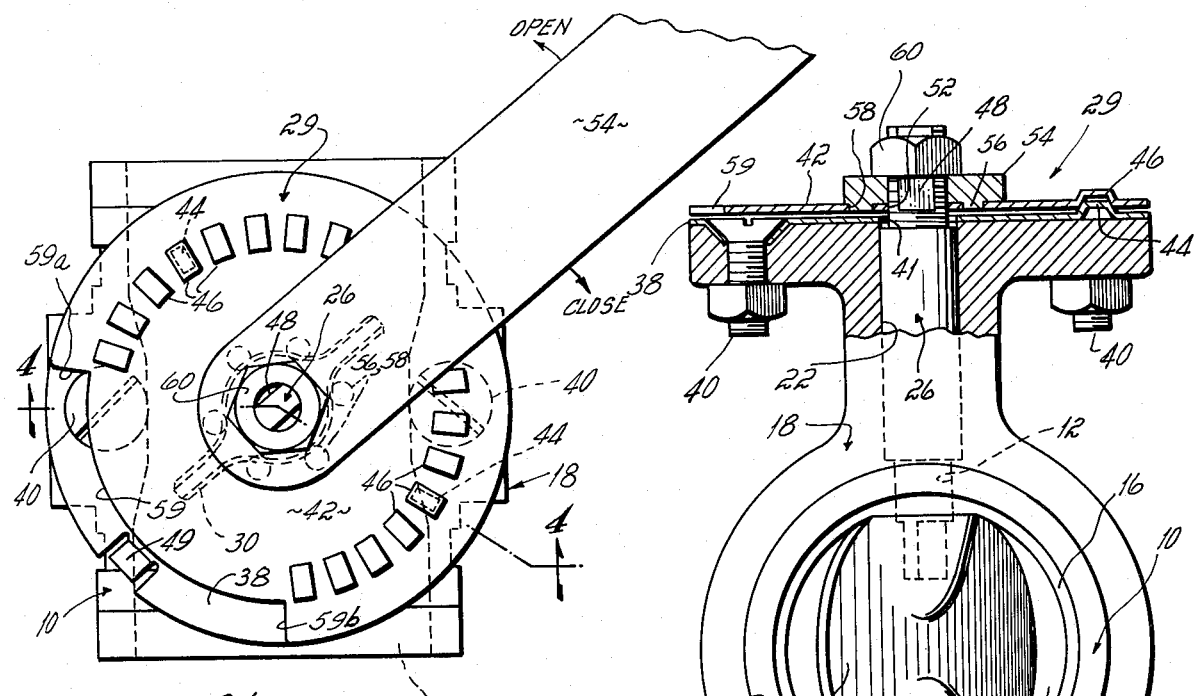
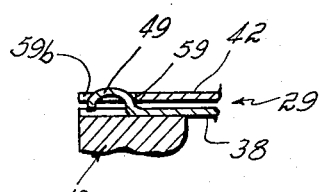

POSITIONING ASSEMBLY FOR VALVE CLOSURE MEMBERS

BACKGROUND OF THE INVENTION

This invention relates to a positioning assembly for valve closure members. More particularly, this invention is directed to a valve closure member positioning assembly which is of very simple and economical construction, but which nevertheless effectively provides means for selectively positioning a valve closure member and for maintaining the closure member in an open, closed or partially open "throttling" position against any pressures exerted by the fluid being controlled by the valve.

There are numerous types of valves currently utilized in industrial applications for controlling the flow of fluids which require the rotation and positioning of a valve stem through an arc of 90°, or greater, to move the valve closure member from an open to a closed position and vice versa. One type of such valve is a butterfly valve. While the present positioning mechanism can be utilized with many different kinds of valves, it is particularly advantageous for use with butterfly valves, and in order to facilitate a fuller understanding of the invention, it will be described in conjunction with such valves.

Butterfly valves are extensively used because of their simplicity and economy of construction and their dependability of operation. Typical, commercially available butterfly valves include a valve housing having a passage for the flow of fluids, a rotatable valve disc for controlling the flow of fluids through the passage and a stem rotatably mounted within the housing and affixed to the valve disc for rotatably supporting and pivoting the valve disc within the passage. Butterfly valves also include means located externally of the valve housing, such as a handle, for rotating the stem and hence the valve disc between an open and closed position. As is well known in the art, the closure disc of a butterfly valve is subject to both static and dynamic pressures of the fluid being controlled. As a result, in many cases a substantial force is imposed upon such a disc when it is in a partially open position. This force tends to rotate the disc toward its fully closed position.

Various types of valve positioning assemblies for positioning the disc of a butterfly valve in an open, or closed position, or in preselected throttling positions wherein the valve disc is held at an angle with respect to the direction of fluid flow, are known to the art. While these assemblies are mechanically operative, they are typically complicated and comprise numerous parts and, hence, are objectionably high in cost. Further, the locking mechanism of such valves are typically independently operative of the rotating and positioning mechanism, thus requiring a separate locking operation on rotation of the valve handle.

OBJECTS OF INVENTION

It is accordingly the principal object of this invention to provide a reliable, simple and economical valve closure member positioning assembly having a minimum number of parts which effectively provide means for rotatably positioning a valve stem and for maintaining the stem in any of its rotated positions.

It is a further object of this invention to provide a valve closure member positioning assembly which is operative to maintain a closure member in an open, closed or a plurality of intermediate positions against substantial pressures due to the fluid being controlled.

It is a still further object of the invention to provide a valve closure member positioning assembly which can be unlocked for movement and subsequently locked in position solely by manipulative movements of the valve handle normally employed to rotate the valve stem.

BRIEF DESCRIPTION

These and other objects are accomplished in accordance with the preferred embodiment of my invention by providing an improved valve closure member positioning assembly including first and second discs through which the rotatable valve stem passes. The first disc is rigidly attached to the housing and includes a pair of circumferentially spaced detents extending upwardly therefrom on opposite sides of the stem. The second disc is resilient and is mounted coaxially with the first disc in facial abutment therewith. The second disc is secured for rotation with the valve stem and includes a plurality of circumferentially spaced detents having downwardly opening cavities. These latter detents cooperate with the detents in the first disc and are effective to define an open position, a closed position and may also include a plurality of throttled positions therebetween.

More particularly, the detents in the second disc are positioned so that two such detents are simultaneously engaged by the two detents of the first disc. Thus, on rotation of the handle and stem, the detents of the second disc move against the sloping sides of the interengaging detents on the stationary plate. As a result, the upper disc, or plate, acts like a flat cantilever spring which exerts an increasing force as it is deflected. The component of this force tangent to the two mating detents at their point of contact not only resists movement of the upper plate, but tends to restore the upper plate to a position in which its detents fully mate with the detents of the lower plate. This force is sufficient to hold the upper plate, stem and valve disc in any selected position against any forces due to the internal fluid acting on the disc. However, when the operator exerts sufficient force on the handle to overcome both the detent forces and the internal fluid forces, the handle and stem can be rotated to reposition the valve disc.

In addition to the detent locking means described above, the upper and lower plates of the present invention perform two additional functions. In the first place, these plates function to provide a positive stop to prevent rotation of the valve disc beyond its fully open and closed positions. Moreover, when the valve positioning member is utilized in conjunction with a butterfly valve of the type disclosed in the pending application of George J. Paptzun for "Butterfly Valve", filed on even date herewith, the valve plates also function to hold the valve stem in assembled relationship with the valve body and disc.

DESCRIPTION OF THE DRAWINGS

These and other objects and advantages of my invention will be apparent from the following detailed description of the invention, reference being had to the accompanying drawings, of which:

FIG. 3 is a top plan view similar to FIG. 1 with the valve disc being in a throttled position;

FIG. 4 is a partial cross-sectional view taken along line 4—4 of FIG. 3; and

FIG. 5 is a cross-sectional view taken along line 5—5 of FIG. 1.

DETAILED DESCRIPTION

While my invention is applicable to any type of valve having a rotatable valve closure member, it is disclosed and described as it is applicable to a butterfly valve. More particularly, it will be disclosed and described as applicable to a particular butterfly valve described in detail in the copending patent application of George J. Paptzun for Butterfly Valve, Ser. No. 437,206, filed concurrently herewith.

Figure 1:
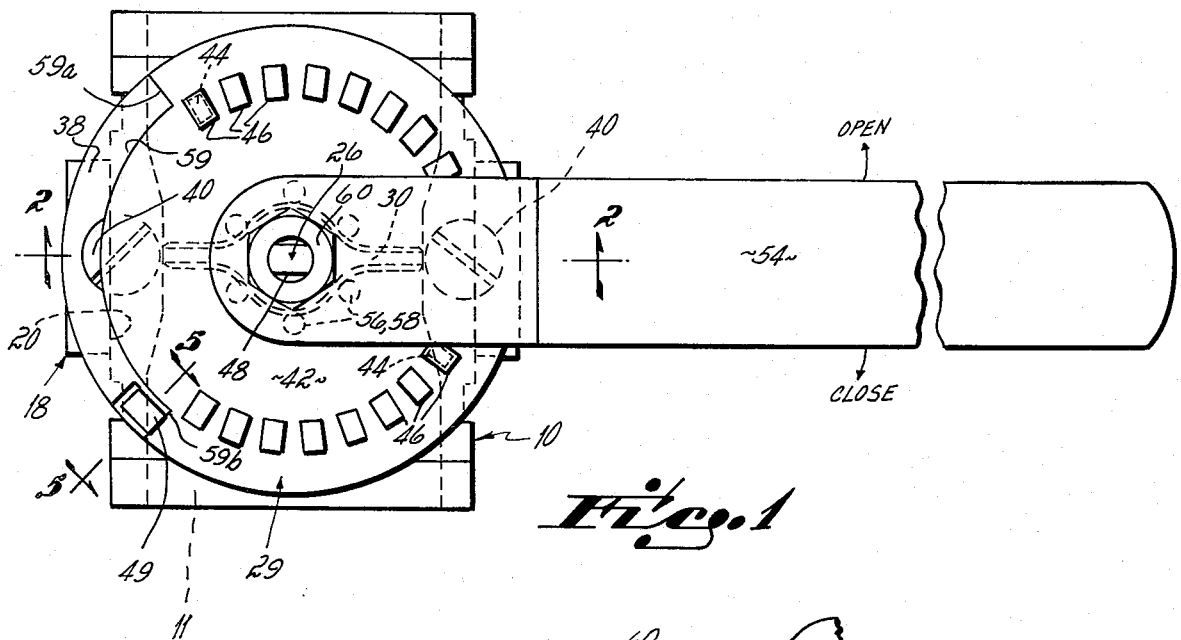
FIG. 1 is a top view of a preferred form of valve constructed in accordance with my invention with the valve disc being in the closed position.
Figure 2:
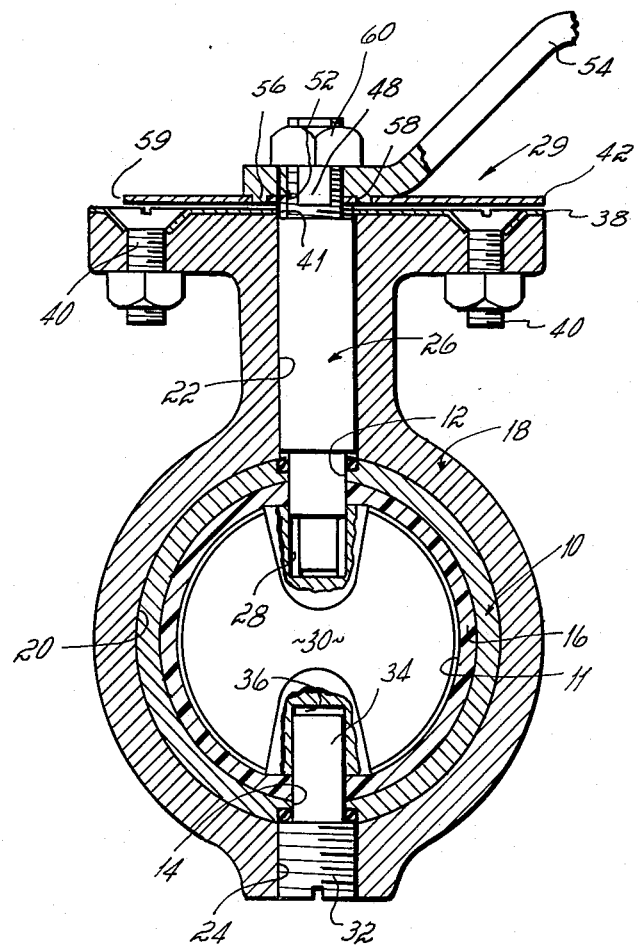
FIG. 2 is a cross-sectional view taken along line 2—2 of FIG. 1.

Referring now to FIGS. 1 and 2, the butterfly valve includes a tubular sleeve member 10 providing a passage 11 for the flow of fluids which is adapted to be interposed in a conduit by any means known in the art, such as by clamping or by means of flanged or threaded ends. The sleeve 10 includes a pair of diametrically opposed openings 12 and 14 in the wall thereof and is provided with a lining 16 of rubber or synthetic rubber material to provide protection against the erosive and/or corrosive effects of fluids flowing therethrough.

The valve further includes a unitary cast valve housing member 18 with a through opening 20 for receiving the sleeve member 10. The housing 18 is provided with a pair of diametrically opposed bores 22 and 24 adapted to be aligned with the openings 12 and 14, respectively, in the sleeve 10. An upper stem 26 rotatably mounted in the housing 18 passes downwardly through the aligned bores 22 and 12 in the housing 18 and sleeve 10. This stem 26 is received in a flat-walled opening 28 formed in disc 30. Valve disc 30 is of generally circular configuration and is rotatably mounted within the sleeve member 10 for movement between an open position and a position closing the passage 11. A threaded member 32 is receivable in the lower bore 24 of the housing for rigidly attaching the housing member 18 to the sleeve member 10. Member 32 includes a stem 34 which extends through the lower opening 14 in the sleeve 10 and engages a circular bore 36 in the lower portion of the valve disc 30. The valve disc 30 is thus supported between the stems for rotatable movement in the sleeve member 10 between a valve open position, in which it extends parallel to passage 11, and a valve closed position, in which it extends across the fluid passageway.

Referring now, in addition, to FIGS. 3 and 4, the upper stem 26 extends out of the housing 18 where there is affixed an assembly 29 for positioning and maintaining the stem 26 and, accordingly, the valve disc 30 in an open position, a closed position and a number of throttled positions in which the valve disc is disposed at various angles to the axis of the fluid passage 11. The valve positioning assembly includes a first, or lower, disc 38 rigidly attached to the valve housing 18 by suitable means, e.g., bolts 40; and a second, or upper, resilient disc 42 spaced above the lower disc 38.

The lower disc 38 has an axial opening 41 disposed centrally thereof through which the stem 26 passes and contains a pair of circumferentially spaced, upwardly extending detents 44 disposed on opposite sides of the stem 26. Detents 44 are preferably in the form of truncated wedges. Lower disc 38 also includes an upstanding tang 49 extending upwardly from a peripheral portion thereof.

The upper disc 42 contains a plurality of detents 46 spaced equally about the circumference of a circle. Detents 46 are disposed so that two of these detents simultaneously engage detents 44 formed on the lower disc as shown in FIG. 3. Detents 46 define a valve open position, a valve closed position and may incorporate a number of partially throttled positions in which the valve disc 30 is held at various angles with respect to the axis of the passageway 11. Disc 42 also includes a cutout peripheral segment or arcuate slot 59 which extends over 90° and terminates in radial shoulders 59a and 59b. Tang 49 is disposed within arcuate slot 59 and is effective to engage shoulders 59a and 59b to stop rotation of the valve disc when it reaches the fully closed and fully open positions, respectively.

The upper flexible disc 42 is secured for rotation with the stem 26 in any suitable manner, such as by means of a pair of flats 48 on the stem end which are engageable with cooperating flats of a central axial opening 52 in the upper disc 42. Disc 42 and stem 26 are rotatable by means of a handle 54 which also includes a pair of flats engageable with the flats 48 on the stem 26 for rotation of the stem 26 on rotation of the handle 54. The handle further includes a plurality of equally spaced, depending projections 56 which fit into corresponding openings 58 in the disc 42 to further assist in rotation of the upper disc 42 on rotation of the stem 26. The handle 54 is secured to the stem 26 and upper disc 42 by means of a nut 60.

In the preferred form of my invention, the discs 38 and 42 are formed of a corrosion resistant material, such as type 410 stainless steel, which is heated to 1825° F. for 5 minutes and quenched to a hardness in the range of 45–50 $R_c$ to provide the disc with resistance to wear and yielding. A suitable alternate would be to use hardened carbon steel discs with plating for corrosion resistance.

When the valve is in its open position, its closed position (FIG. 1), or any of the throttled positions (FIGS. 3 and 4), the inner surfaces of the detents 46 in the upper disc 42 engage the outer surfaces of the detents 44 in the lower disc 38. These interengaging detents at their point of contact thus resist rotation of the upper disc 42 in relation to the lower disc 38, thereby locking the valve disc 30 in position against the internal fluid forces acting on it, which tend to rotate it, and against accidental external forces moving it from the desired position.

As the valve handle is rotated, the upper detents move against the sides of the lower detents. The lower detents being fixed deflect the upper disc causing the upper detents to move up the sides of the lower detents. The upper disc exerts an increasing force as it is deflected. When sufficient force is applied to the valve handle to overcome this force and the internal fluid forces acting on the valve disc, the stem can be rotated. When a desired valve position is reached, the detents again engage, thus locking the valve in position. Since the two pairs of interengaging detents are disposed on opposite sides of shaft 26, the forces on the two detent plates are substantially balanced.

The valve positioning assembly heretofore described is effective to hold the valve in a closed position, any of several intermediate throttling positions, or in the full open position. By varying the thickness and diameter of the upper disc and the height, shape and number of detents in the lower disc, the amount of operating force can be varied as required. For example, I have found that an upper disc having a thickness in the range of about 0.038 to 0.043 inch, formed of 410 stainless steel treated as above described, when spaced from a lower disc by about 0.015 inch, with the lower disc having a pair of opposed detents of generally 0.08 inch height and 0.23 inch length, disposed on the circumference of a circle having a diameter of about 2.375 inch is effective in locking a valve disc having a maximum diameter of about 1.86 inch in position against the flow of fluids at line pressures in the range of 150 to 200 psi. Furthermore, the upper disc has sufficient hardness, resistance to yielding and flexibility to be deflected and again assume its undeflected shape on rotation of the valve. The number of positions of the valve can be varied by changing the number of detents in the upper disc.

Although my invention has been described in terms of certain preferred embodiments, it will be recognized by those skilled in the art that other forms may be adopted within the scope of the invention. For example, in large size valves, it is often desirable to provide the stationary plate with more than two detents so that the torque capacity of the mechanism is increased. Also, in some types of valves it is necessary that the valve closure member be held only in its open and closed positions. In such valves the upper plate need not be provided with detents corresponding to intermediate throttled positions. Accordingly, I desire to be limited only by the scope of the following claims.

What is claimed is:

1. A valve positioning assembly for use in combination with a valve including a housing providing a passage for the flow of fluids therethrough, a valve closure member movably mounted within said passage between an open position and a closed position, a valve stem rotatably mounted in said housing and interconnected to said closure member for moving said closure member relative to said passage, and a handle secured to said stem, said valve positioning assembly comprising in combination:
   a first plate rigidly attached to the exterior of said valve housing having an opening through which said stem passes perpendicular to the plane of said plate and a detent extending upwardly therefrom, said detent being spaced from said stem; and
   a second, resilient plate mounted on said stem above said first plate and having a plurality of spaced detents extending upwardly therefrom defining said open position and said closed position, said detents on said first and said second plates being interengageable and operative to hold said valve closure member in said open and closed positions, said second plate further including:
   a plurality of detents corresponding to a plurality of intermediate throttled positions and said detents on said first and second plates are further operative to hold said valve closure member in said intermediate throttled positions.

2. The valve positioning assembly of claim 1 in which said first plate is provided with a pair of detents disposed on opposite sides of said stem, said pair of detents being disposed for simultaneously engaging two detents on said second plate.

3. The valve positioning assembly of claim 2 in which said detents are of truncated wedge configuration.

4. The valve positioning assembly of claim 2 in which said first and second plates are further provided with means for positively preventing movement of said stem beyond said open and said closed positions of said closure member.

5. The valve positioning assembly of claim 4 in which said means for positively preventing movement of said stem beyond said open and closed positions of said closure member comprises an upstanding tang formed on said first plate and an arcuate slot in said second plate, said arcuate slot receiving said tang and terminating in two radial shoulders adapted to engage said tang.

6. A valve positioning assembly for use in combination with a butterfly valve including a housing providing a passage for the flow of fluids therethrough, a valve disc pivotally mounted within said passage between an open position and a closed position, a valve stem rotatably mounted in said housing and interconnected to said valve disc for rotatably supporting and pivoting said valve disc in said passage, and a handle secured to said stem, said valve positioning assembly comprising, in combination:
   a first plate rigidly attached to the exterior of said valve housing having an opening through which said stem passes perpendicular to the plane of said plate and a detent extending upwardly therefrom, said detent being spaced from said stem; and
   a second, flexible plate mounted on said stem above said first plate and having a plurality of corresponding spaced detents extending upwardly therefrom defining said open position and said closed position, said detents on said first and said second plates being interengageable and operative to hold said valve disc in said open and closed positions against the force of fluids in said passage, said second plate further including:
   a plurality of detents corresponding to a plurality of intermediate throttled positions and said detents on said first and second plates are further operative to hold said valve closure member in said intermediate throttled positions.

7. The valve positioning assembly of claim 6 in which said first plate is provided with at least a pair of detents disposed on opposite sides of said stem, said detents being disposed for simultaneously engaging at least two detents on said second plate.

8. The valve positioning assembly of claim 7 in which said detents are of truncated wedge configuration.

9. The valve positioning assembly of claim 6 in which said first and second plates are further provided with means for positively preventing movement of said stem beyond said open and said closed positions of said disc.

10. The valve positioning assembly of claim 9 in which said means for positively preventing movement of said stem beyond said open and closed positions of said disc comprises an upstanding tang formed on said first plate and an arcuate slot in said second plate, said arcuate slot receiving said tang and terminating in two radial shoulders adapted to engage said tang.

11. The valve positioning assembly of claim 7 in which said handle includes a flat portion engageable with a cooperating flat portion on said stem and a plurality of depending projections engageable with corresponding openings in said second plate.

* * * * *